(12) United States Patent
Meier et al.

(10) Patent No.: US 7,632,316 B2
(45) Date of Patent: Dec. 15, 2009

(54) REACTIVE DYESTUFF, METHOD FOR PRODUCTION THEREOF AND USE OF THE SAME

(75) Inventors: Stefan Meier, Frankfurt (DE); Uwe Reiher, Hofheim (DE); Werner Hubert Russ, Flörsheim-Wicker (DE); Günther Schwaiger, Frankfurt Am Main (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 11/915,955

(22) PCT Filed: May 24, 2006

(86) PCT No.: PCT/EP2006/062581

§ 371 (c)(1),
(2), (4) Date: Jan. 31, 2008

(87) PCT Pub. No.: WO2006/128822

PCT Pub. Date: Dec. 7, 2006

(65) Prior Publication Data

US 2008/0189880 A1      Aug. 14, 2008

(30) Foreign Application Priority Data

May 30, 2005   (DE) ................. 10 2005 025 010

(51) Int. Cl.
C09B 62/00 (2006.01)

(52) U.S. Cl. .............. 8/549; 8/565; 8/587; 8/588; 8/589; 8/590; 8/593; 8/638; 8/639; 8/640; 534/638

(58) Field of Classification Search .......... 8/549, 8/565, 587, 588, 589, 590, 593, 638, 639, 8/640; 534/638
See application file for complete search history.

(56) References Cited

U.S. PATENT DOCUMENTS

| | | | |
|---|---|---|---|
| 5,231,172 A | 7/1993 | Beck et al. | |
| 5,298,607 A | 3/1994 | Seiler et al. | |
| 5,308,362 A | 5/1994 | Kayane et al. | |
| 5,529,585 A | 6/1996 | Schrell et al. | |
| 5,986,087 A | 11/1999 | Schrell et al. | |
| 6,001,995 A | 12/1999 | Schrell et al. | |

FOREIGN PATENT DOCUMENTS

| | | |
|---|---|---|
| DE | 1911427 | 9/1970 |
| DE | 2927102 A1 | 1/1980 |
| DE | 3102287 | 8/1982 |
| DE | 4138083 A1 | 6/1992 |
| DE | 4425222 A1 | 1/1996 |
| EP | 0021105 A1 | 1/1981 |
| EP | 0056975 A2 | 8/1982 |
| EP | 0538785 A2 | 4/1993 |
| EP | 0567 036 A1 * | 10/1993 |
| EP | 0567036 A1 | 10/1993 |
| EP | 0692559 A1 | 1/1996 |
| GB | 1302519 | 1/1973 |
| GB | 2026527 | 2/1980 |
| GB | 2250297 A1 | 6/1992 |
| WO | WO-96/37641 A1 | 11/1996 |
| WO | WO-96/37642 A1 | 11/1996 |
| ZA | 95/5932 | 7/1995 |

OTHER PUBLICATIONS

STIC Search Report dated Jan. 22, 2009.*
Rath, H., "Lehrbuch der Textilchemie", einschließlich der textilchemischen Technologie, 1972, 3rd edition, pp. 295-299.
Bellhouse, E., "Machine washable wool dye selection and dyeing methods", JSDC, 1975, pp. 33-37.
Lewis D. M., Production of Fast Dyeing on Resin-treated Wool, JSDC, 1972, vol. 88, No. 3, pp. 93-99.

* cited by examiner

*Primary Examiner*—Eisa B Elhilo
(74) *Attorney, Agent, or Firm*—Connolly Bove Lodge & Hatz LLP

(57) ABSTRACT

The present invention relates to dyes of the general formula (1)

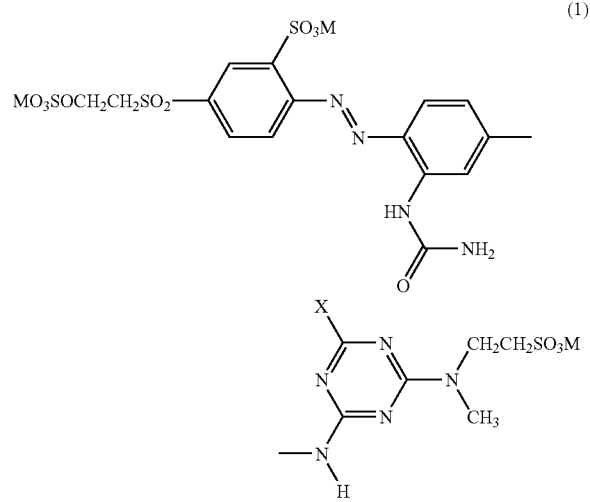

where M and X are each as defined in claim 1, dye mixtures comprising one or more of the dyes of the general formula (1) and also one or more further fiber-reactive dyes, processes for their preparation, their use and printing inks comprising same.

15 Claims, No Drawings

REACTIVE DYESTUFF, METHOD FOR PRODUCTION THEREOF AND USE OF THE SAME

RELATED APPLICATIONS

This application is a national stage application (under 35 U.S.C. 371) of PCT/EP2006/062581 filed May 24, 2006, which claims benefit of German application 10 2005 025 010.6 filed May 30, 2005.

This invention relates to the technical field of fiber-reactive azo dyes.

The commercial practice of dyeing with fiber-reactive dyes has led to heightened expectations with regard to the quality of the dyeings and the economics of the dyeing operations. There consequently continues to be a demand for novel fiber-reactive dyes having improved properties. Especially in the case of dyes having a yellow hue the demand is for reactive dyes that provide high color strengths.

Numerous fiber-reactive dyes are described in the literature as useful for dyeing or printing hydroxyl- and/or carboxamido-containing fibers, such as cellulosic fibers in particular, to produce yellow dyeings.

Of these dyes, it is especially those which are known from DE 29 27 102 A, DE 31 02 287, and EP 0 021 105 A1 which are of industrial interest. However, these conventional yellow-dyeing dyes do not adequately meet the latest requirements with regard to their use in specific dyeing processes, the dyeability of the fibers and the fastness properties of dyeings obtainable therewith, for example.

EP 0 567 036 A1 further describes yellow-dyeing fiber-reactive dyes that do not adequately satisfy the stated criteria. Especially the color strength of these products on cellulose fibers is unsatisfactory.

The present invention, then, provides dyes and dye mixtures whose dyeings surprisingly have a distinctly higher color strength compared with the dyes described in EP 0 567 036 A1.

The present invention accordingly relates to dyes of the general formula (1)

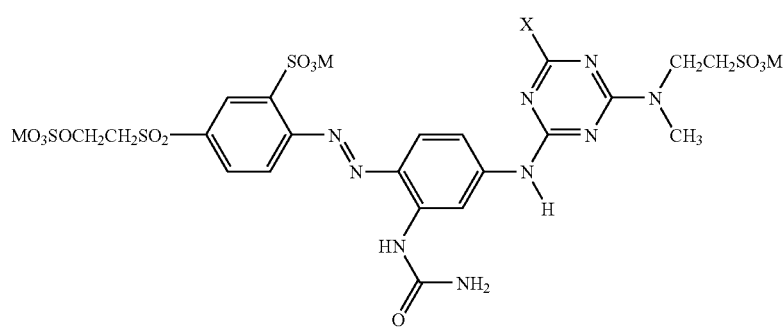

where

M is hydrogen or an alkali metal, and

X is chlorine or fluorine.

The present invention also relates to dye mixtures comprising one or more of the dyes of the general formula (1) and also one or more further fiber-reactive dyes.

Preferred dye mixtures according to the present invention comprise one or more of the dyes of the general formula (1) and also at least one dye selected from the general formulae (2), (3) and (4)

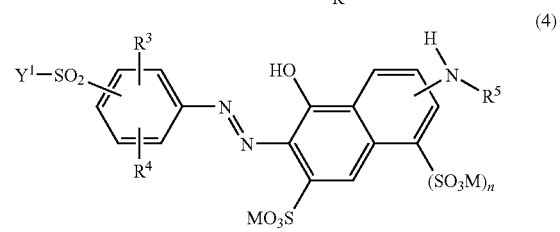

where

D is the radical of benzene or of naphthalene;

$R^1$ is hydrogen, $(C_1-C_4)$-alkyl, $(C_1-C_4)$-alkoxy or $-SO_3M$;

$R^2$ is amino, $(C_1-C_4)$-alkyl or $(C_1-C_4)$-alkyl substituted by $-COOM$, $-SO_3M$ or $-SO_2-Y^1$;

$R^3$ is hydrogen, chlorine, $(C_1-C_4)$-alkyl, $(C_1-C_4)$-alkoxy or $-SO_3M$;

$R^4$ is hydrogen, $(C_1-C_4)$-alkyl or $(C_1-C_4)$-alkoxy;

$R^5$ is hydrogen or $-CO-R^2$ or has one of the meanings of Z;

$Y^1$ is vinyl or is ethyl substituted by an alkali-eliminable substituent in the β position;

Z is a fiber-reactive radical from the series of the halopyrimidines, of the dichloro-quinoxalines or of the halotriazines;

m is 1, 2 or 3;

n is 0 or 1; and

M is as defined above.

In the general formulae (1) to (4), alkali metal M is preferably sodium, potassium or lithium. ($C_1$-$C_4$)-Alkyl groups may be straight chain or branched and may be for example methyl, ethyl, n-propyl, i-propyl, n-butyl, i-butyl, sec-butyl or tert-butyl. Methyl and ethyl are particularly preferred. The same, mutates mutandis, holds for ($C_1$-$C_4$)-alkoxy groups, for which methoxy or ethoxy are accordingly particularly preferred.

The substituent $R^1$ is preferably hydrogen, methyl or methoxy. The substituent $R^2$ is preferably methyl or amino. The substituent $R^3$ is preferably hydrogen, methyl, methoxy or chlorine. The substituent $R^4$ is preferably hydrogen, methyl or methoxy.

Alkali-eliminable substituents in the β position of ethyl $Y^1$ are in particular chlorine, sulfato, thiosulfato, phosphato, ($C_2$-$C_5$)-alkanoyloxy, for example acetyloxy, and sulfobenzoyloxy. It is particularly preferred for $Y^1$ to be vinyl or β-sulfatoethyl.

The groups "sulfato", "thiosulfato" and "phosphato" include not only their acid form but also their salt form. Accordingly, thiosulfato groups conform to the general formula —S—$SO_3M$, phosphate groups to the general formula —$OPO_3M_2$ and sulfato groups to the general formula —$OSO_3M$, in each of which M is as defined above.

The group $(MO_3S)_m$-D- in the general formula (2) is preferably a group of the general formula (5), (6) or (7)

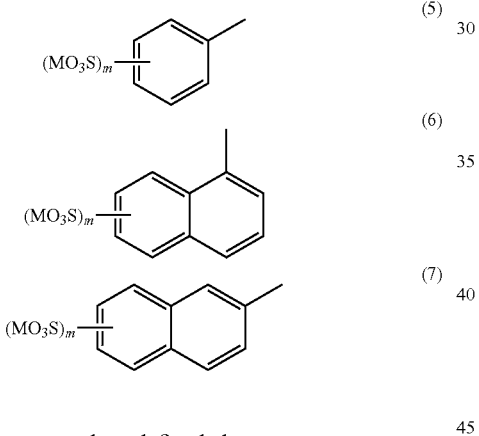

where M and m are each as defined above.

It is particularly preferred for the group $(MO_3S)_m$-D- in the general formula (2) to represent the groups of the general formulae (5a) to (5c) and also of the general formulae (7a) to (7e)

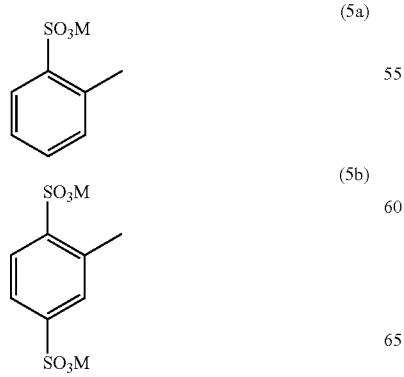

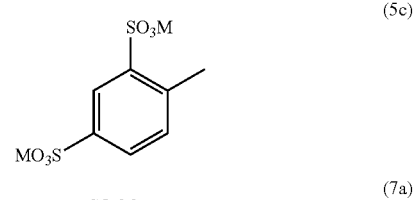

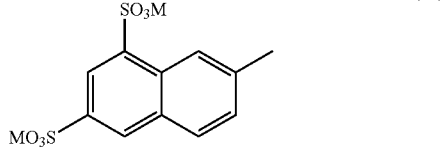

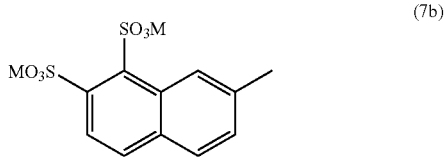

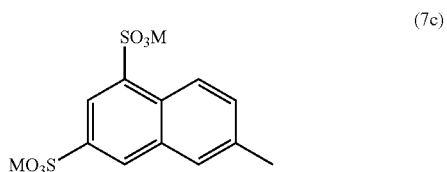

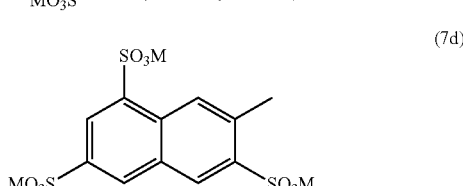

Fiber-reactive radicals Z from the series of the halopyrimidines have in particular the general formula (8)

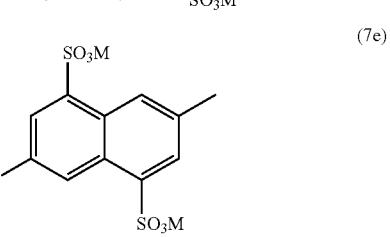

where $X^1$ to $X^3$ are independently hydrogen, cyano or halogen, in particular fluorine or chlorine, subject to the proviso that at least one of $X^1$ to $X^3$ is halogen.

Particularly preferred fiber-reactive radicals from the series of the halopyrimidines have the following formulae (8a) to (9g):

(8a) 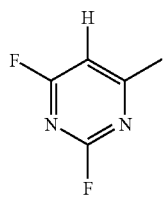

(8b) 

(8c) 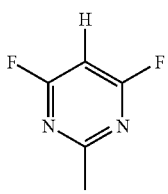

(8d) 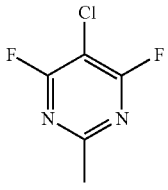

(8e) 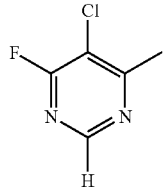

(8f) 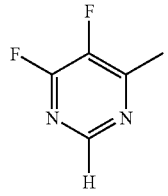

(8g) 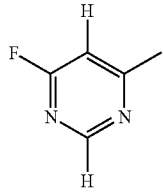

(8h) 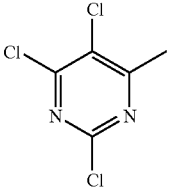

-continued (8i) 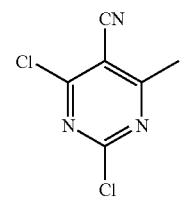

Fiber-reactive radicals Z from the series of the halotriazines have in particular the general formula (9)

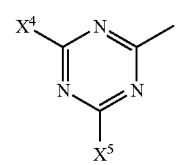  (9)

where $X^4$ is halogen, in particular fluorine or chlorine, or —NHCN or is $X^5$; and $X^5$ is a group of the general formula (10)

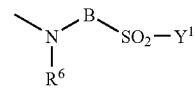  (10)

where $R^6$ is hydrogen or $(C_1-C_4)$-alkyl, in particular methyl;

B is $(C_2-C_6)$-alkylene, in particular ethylene, is $(C_2-C_6)$-alkylene interrupted by a heteroatom, in particular —O—, or is phenylene; and $Y^1$ is as defined above.

Particularly preferred fiber-reactive radicals from the series of the halotriazines have the following formulae (9a) to (9g):

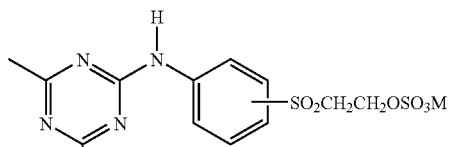  (9a)

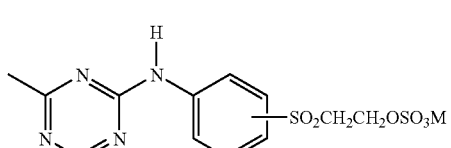  (9b)

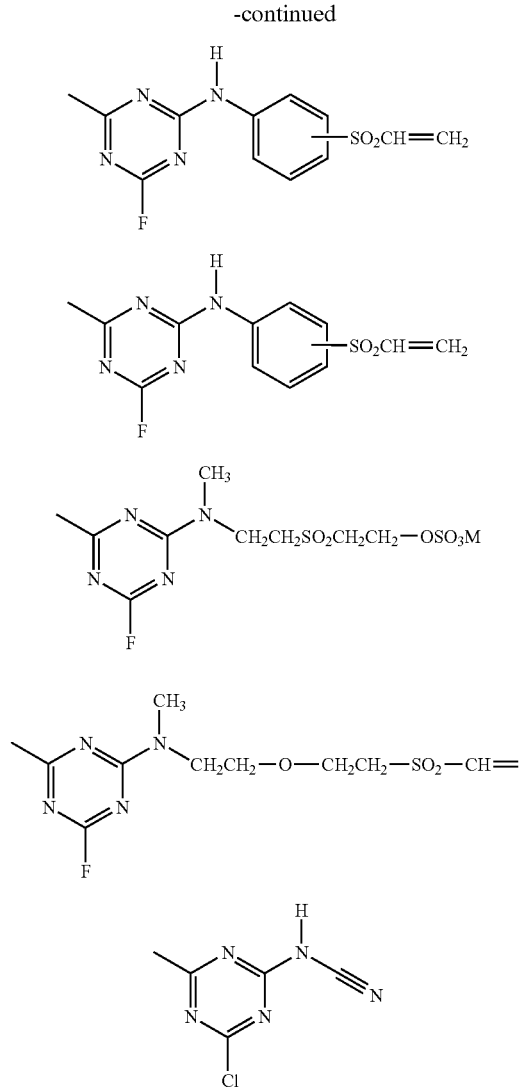

where M is as defined above.

In general, in the dye mixtures of the present invention, the dye of the general formula (1) is present in an amount from 90% to 10% by weight, preferably 70% to 30% by weight and more preferably 60% to 40% by weight, and at least one dye selected from the general formulae (2), (3) and (4) is present in an amount from 10% to 90% by weight, preferably 30% to 70% by weight and more preferably 40% to 60% by weight, all based on the total amount of dye.

Dyes of the general formulae (2) to (4) that contain an —$SO_2$—$Y^1$ group can be present in mixtures in which the individual dyes differ only in the reactive group —$SO_2$—$Y^1$. Preferred mixtures of this kind contain for example a dye of the general formulae (2), (3) or (4) where Y=vinyl and a dye of the general formulae (2), (3) or (4) where Y=β-sulfatoethyl. The fraction of dye in the vinylsulfonyl form may be up to about 30 mol %, based on the particular dye chromophore. Preferably, the fraction of vinylsulfonyl dye to β-ethyl-substituted dye is in a molar ratio between 5:95 and 30:70.

The present invention's dyes of the general formula (I) and also the present invention's dye mixtures are generally present as a formulation in solid or liquid (dissolved) form. In solid form, they generally contain the electrolyte salts customary in the case of water-soluble and in particular fiber-reactive dyes, such as sodium chloride, potassium chloride and sodium sulfate, and may further contain the auxiliaries customary in commercial dyes, such as buffer substances capable of setting a pH in aqueous solution between 3 and 7, such as sodium acetate, sodium borate, sodium bicarbonate, sodium dihydrogen-phosphate, sodium tricitrate and disodium hydrogenphosphate, small amounts of siccatives or when they are present in liquid, aqueous solution (including a content of thickeners of the type customary in print pastes), they may also contain substances which ensure a long life for this formulations, examples being mold-preventing agents.

The present invention's dyes of the general formula (I) and also the present invention's dye mixtures are preferably present as a dye powder or as a dye granulate containing 10% to 80% by weight, based on the powder or granulate, of an electrolyte salt which is also known as a standardizing agent. Granulates have particle sizes in particular of 50 to 500 μm. These solid formulations may additionally contain the aforementioned buffer substances in a total amount up to 10% by weight, based on the formulation. When the dyes or dye mixtures are present in aqueous solution, the total dye content in these aqueous solutions is up to about 50% by weight, for example between 5% and 50% by weight, the electrolyte salt content in these aqueous solutions preferably being below 10% by weight, based on the aqueous solution. The aqueous solutions (liquid formulations) may generally contain the aforementioned buffer substances in an amount up to 10% by weight, preferably up to 2% by weight.

The present invention's dyes of the general formula (1) can be prepared by acylating a monoazo compound of the general formula (11)

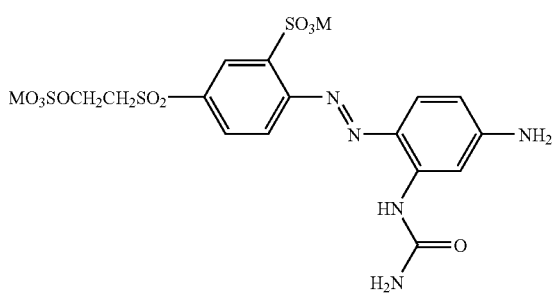

where M is as defined above, with a triazine compound of the general formula (12)

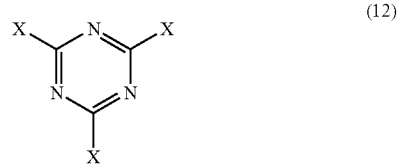

where X is as defined above, and then condensing the resulting compound of the general formula (13)

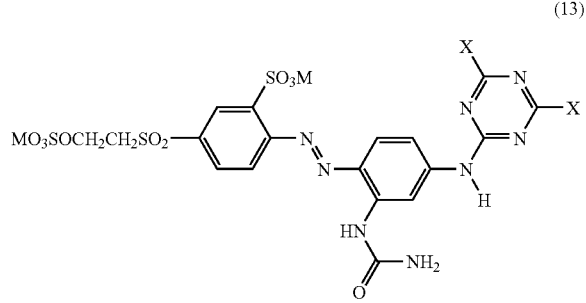

(13)

with N-methyltaurine.

The monoazo compound of the general formula (11) is known from DE-A 4425222 and can be prepared similarly to the directions given therein.

To prepare the present invention's dye of the general formula (1) where X is chlorine, the acylation of the monoazo compound of the formula (11) with cyanuric chloride and also the subsequent condensation with N-methyltaurine is carried out in the weakly acidic to neutral range. The reaction temperature is normally 20-40° C. for the acylation and 50-60° C. for the condensation.

The present invention's dye of the general formula (1) where X is fluorine is preferably prepared by acylating the monoazo compound of the formula (11) with cyanuric fluoride at 0 to −2° C. in the weakly acidic range and then condensing with N-methyltaurine in the neutral to weakly acidic range and at 20-25° C.

The dye mixtures of the present invention are obtainable by mechanically mixing the individual dyes in the desired weight ratio. The individual dyes may be utilized in the form of dye powders or dye solutions or else in the form of formulated commercial forms, i.e., for example as a powder, as a granulate or as a liquid brand, which include customary auxiliaries.

The dyes of the general formulae (2) and (3) are known and described for example in DE-A 3102287, U.S. Pat. No. 5,298,607, EP 0 021 105 A1 and DE-A 1911427. They can be prepared similarly to the directions given therein. Similarly, dyes of the general formula (4) have been extensively described and are obtainable via standard methods of synthesis.

The present invention's dyes and dye mixtures include further fiber-reactive dyes, in an amount up to 5% by weight, based on the total amount of dye, for shading purposes. These "shading dyes" can be added by customary mixing or else be prepared chemically in the same reaction batch together with the synthesis of a dye according to the present invention or of a dye mixture and be incorporated into the dye or dye mixture.

The present invention's dyes and dye mixtures are useful for dyeing or printing hydroxyl- and/or carboxamido-containing materials and possess valuable performance characteristics for these purposes.

The present invention thus also relates to the use of the present invention's dyes of the general formula (1) and also of the present invention's dye mixtures for dyeing or printing hydroxyl- and/or carboxamido-containing materials or to be more precise to processes for dyeing or printing such materials in a conventional manner.

Hydroxyl- and/or carboxamido-containing materials may be present for example in the form of sheetlike constructions or self-supporting films, but in particular in the form of fibers. Fibers in turn are preferably textile fibers, such as wovens or yarns which can be used in the form of hanks or wound packages.

Carboxamido-containing materials are for example natural and synthetic polyamides and polyurethanes, for example wool and other animal hairs, soap, leather, nylon-6,6, nylon-6, nylon-11 and nylon-4.

Preference is given to hydroxyl-containing materials of natural or synthetic origin, for example cellulose fiber materials or their regenerated products and polyvinyl alcohols. Cellulose fiber materials are preferably cotton, but also other vegetable fibers, such as linen, hemp, jute and ramie fibers. Regenerated fibers of cellulose are for example staple viscose and filament viscose and also chemically modified fibers of cellulose, such as aminated fibers of cellulose or fibers as described for example in WO 96/37641 and WO 96/37642 and also in EP-A-0 538 785 and EP-A-0 692 559.

The present invention's dyes and dye mixtures can be applied to and fixed on the substrates mentioned, especially the fiber materials mentioned, by the application techniques known for water-soluble dyes and especially for fiber-reactive dyes. For instance, on cellulose fibers they produce by the exhaust method from a long liquor and also from a short liquor, for example in a liquor to goods ratio of 5:1 to 100:1, preferably 6:1 to 30:1, using various acid-binding agents and optionally neutral salts as far as necessary, such as sodium chloride or sodium sulfate, dyeings having very good color yields. Application is preferably from an aqueous bath at temperatures between 40 and 105° C., optionally at a temperature of up to 130° C. under superatmospheric pressure, but preferably at 30 to 95° C., especially 45 to 65° C., in the presence or absence of customary dyeing auxiliaries.

One possible procedure here is to introduce the material into the warm bath and to gradually heat the bath to the desired dyeing temperature and complete the dyeing process at that temperature. The neutral salts which accelerate the exhaustion of the dyes may also if desired only be added to the bath after the actual dyeing temperature has been reached.

Padding processes likewise provide excellent color yields and a very good color buildup on cellulose fibers, the dyes being fixable in a conventional manner by batching at room temperature or elevated temperature, for example at up to 60° C., or in a continuous manner, for example by means of a pad-dry-pad steam process, by steaming or using dry heat.

Similarly, the customary printing processes for cellulose fibers, which can be carried out in one step, for example by printing with a print paste containing sodium bicarbonate or some other acid-binding agent and by subsequent steaming at 100 to 103° C., or in two steps, for example by printing with a neutral or weakly acidic print color and then fixing either by passing the printed material through a hot electrolyte-containing alkaline bath or by overpadding with an alkaline electrolyte-containing padding liquor and subsequent batching or steaming or dry heat treatment of the alkali-overpadded material, produce strong color prints with well-defined contours and a clear white ground. The outcome of the prints is affected little, if at all, by variations in the fixing conditions.

When fixing by means of dry heat in accordance with the customary thermofix processes, hot air at 120 to 200° C. is used. In addition to the customary steam at 101 to 103° C., it is also possible to use superheated steam and high-pressure steam at temperatures of up to 160° C.

The acid-binding agents which effect the fixation of the dyes and of the dye mixtures according to the invention on the cellulose fibers are for example water-soluble basic salts of alkali metals and likewise alkaline earth metals of inorganic or organic acids or compounds which liberate alkali in the heat, and also alkali metal silicates. Especially suitable are the alkali metal hydroxides and alkali metal salts of weak to medium inorganic or organic acids, the preferred alkali metal compounds being the sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, trisodium phosphate or waterglass or mixtures thereof, for example mixtures of aqueous sodium hydroxide solution and waterglass.

The present invention's dyes and dye mixtures possess excellent color strength on cellulose fiber materials when applied by dyeing and printing.

The dyeings and prints obtainable with the dyes and dye mixtures according to the invention possess bright shades; more particularly, the dyeings and prints on cellulose fiber materials possess good lightfastness and especially good wetfastnesses, such as fastness to washing, milling, water, seawater, crossdyeing and acidic and alkaline perspiration, also good fastness to heat-setting and pleating and crocking. Furthermore, the cellulose dyeings obtained following the customary aftertreatment of rinsing to remove unfixed dye portions exhibit excellent wetfastnesses, in particular since unfixed dye portions are easily washed off because of their good solubility in cold water.

Furthermore, the dye mixtures according to the invention can also be used for the fiber-reactive dyeing of wool. Moreover, wool which has been given a nonfelting or low-felting finish (cf. for example H. Rath, Lehrbuch der Textilchemie, Springer-Verlag, 3rd edition (1972), pages 295-299, especially finished by the Hercosett process (page 298); J. Soc. Dyers and Colourists 1972, 93-99, and 1975, 33-44) can be dyed to very good fastness properties. The process of dyeing on wool is here carried out in a conventional manner from an acidic medium. For instance, acetic acid and/or ammonium sulfate or acetic acid and ammonium acetate or sodium acetate can be added to the dyebath to obtain the desired pH. To obtain a dyeing of acceptable levelness, it is advisable to add a customary leveling agent, for example a leveling agent based on a reaction product of cyanuric chloride with three times the molar amount of an aminobenzenesulfonic acid and/or of an aminonaphthalenesulfonic acid or on the basis of a reaction product of for example stearylamine with ethylene oxide. For instance, the dye or the dye mixture according to the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dyes and dye mixtures according to the invention is very good, they can also be used with advantage in customary continuous dyeing processes. The color strength of the dyes and dye mixtures according to the invention is very high.

The abovementioned dyes and dye mixtures can also be formulated into printing inks for digital textile printing.

The present invention thus also relates to printing inks comprising a dye of the general formula (1) according to the present invention or a dye mixture according to the present invention.

The amounts in which the present invention's dyes of the general formula (1) or the present invention's dye mixtures are present in such printing inks range for example from 0.1% by weight to 50% by weight, preferably from 1% by weight to 30% by weight and more preferably from 1% by weight to 15% by weight, based on the total weight of the ink. For the inks to be used in the continuous flow process, a conductivity of 0.5 to 25 mS/m can be set by adding an electrolyte. Useful electrolytes include for example lithium nitrate and potassium nitrate.

The printing inks mentioned may include organic solvents with a total content of 1-50%, preferably of 5-30% by weight based on the total weight of the ink.

Examples of suitable organic solvents are alcohols, such as methanol, ethanol, 1-propanol, isopropanol, 1-butanol, tert-butanol and pentyl alcohol, for example; polyhydric alcohols, such as 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol and 1,2-octanediol, for example; polyalkylene glycols, such as polyethylene glycol and polypropylene glycol, for example; alkylene glycols having 2 to 8 alkylene groups, such as monoethylene glycol, diethylene glycol, triethylene glycol, tetraethylene glycol, thioglycol, thiodiglycol, butyltriglycol, hexylene glycol, propylene glycol, dipropylene glycol and tripropylene glycol, for example; lower alkyl ethers of polyhydric alcohols, such as ethylene glycol, monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether and tripropylene glycol isopropyl ether, for example; polyalkylene glycol ethers, such as polyethylene glycol monomethyl ether, polypropylene glycol glycerol ether, polyethylene glycol tridecyl ether and polyethylene glycol nonyiphenyl ether, for example; amines, such as methylamine, ethylamine, triethylamine, diethylamine, dimethylamine, trimethylamine, dibutylamine, diethanolamine, triethanolamine, N-acetylethanolamine, N-ormylethanolamine and ethylenediamine, for example; urea derivatives, such as urea, thiourea, N-methylurea, N,N'-epsilon-dimethylurea, ethyleneurea and 1,1,3,3-tetramethylurea, for example; amides, such as dimethylformamide, dimethylacetamide and acetamide, for example; ketones or keto alcohols, such as acetone and diacetone alcohol, for example; cyclic ethers, such as tetrahydrofuran, trimethylolethane, trimethylolpropane, 2-butoxyethanol, benzyl alcohol, 2-butoxyethanol, gamma-butyrolactone, epsilon-caprolactam, for example; additionally sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolacetone, trimethylpropane, 1,2-dimethoxypropane, dioxane, ethyl acetate, ethylenediaminetetraacetate, ethyl pentyl ether, 1,2-dimethoxypropane and trimethylpropane.

The inks may further include the customary additives, such as, for example, viscosity moderators to set viscosities in the range from 1.5 to 40.0 mPa·s in a temperature range from 20 to 50° C. Preferred inks have a viscosity of 1.5 to 20 mPas and particularly preferred inks a viscosity of 1.5 to 15 mPas.

Useful viscosity moderators include rheological additives, examples being the following: polyvinylcaprolactam, polyvinylpyrrolidone and their copolymers, polyether polyol, associative thickener, polyurea, polyurethane, sodium alginates, modified galactomannans, polyetherurea, polyurethane, and nonionic cellulose ethers.

As further additions the inks mentioned may include surface-active substances to set surface tensions of 20 to 65 mN/m, which are adapted where appropriate as a function of the process used (thermal or piezo technology).

Useful surface-active substances include, for example, surfactants of all kinds, preferably nonionic surfactants, butyldiglycol and 1,2-hexanediol.

The inks mentioned may further include customary additions, such as substances for preventing fungal and bacterial growth, for example, in amounts of 0.01% to 1% by weight, based on the total weight of the ink.

The inks mentioned may be prepared in a conventional manner by mixing the components in water.

The inks mentioned are useful for use in inkjet printing processes for printing a wide variety of pretreated materials, such as silk, leather, wool, polyamide fibers and polyurethanes, and especially cellulosic fiber materials of any kind. Examples of fiber materials of this kind include the natural cellulose fibers, such as cotton, linen and hemp, and pulp and regenerated cellulose. The present invention's inks are also useful for printing pretreated hydroxyl- or amino-containing fibers present in the blend fabrics, examples being blends of cotton, silk or wool with polyester fibers or polyamide fibers.

In contrast to conventional textile printing, where the printing ink already contains all the fixing chemicals and thickeners for a reactive dye, in inkjet printing the assistants have to be applied to the textile substrate in a separate pretreatment step.

The pretreatment of the textile substrate, such as cellulose fibers and regenerated cellulose fibers, and also silk and wool, for example, takes place prior to printing, using an aqueous alkaline liquor. The fixing of reactive dyes requires alkali, such as sodium carbonate, sodium bicarbonate, sodium acetate, trisodium phosphate, sodium silicate or sodium hydroxide, alkali donors such as, for example, sodium chloroacetate or sodium formate, hydrotropic substances such as, for example, urea, reduction inhibitors, such as, for example, sodium nitrobenzenesulfonates, and also thickeners to prevent the motifs flowing when the printing ink is applied. The latter are, for example, sodium alginates, modified polyacrylates or highly etherified galactomannans.

These pretreatment reagents are applied uniformly to the textile substrate in a defined amount using suitable applicators, examples being a 2- or 3-roll padder, using contactless spraying technologies, by means of foam application, or using appropriately adapted inkjet technologies, and are subsequently dried. Printing is followed by drying of the textile fiber material at 120 to 150° C. and then by fixing.

The fixing of the inkjet prints can be carried out at room temperature or with saturated steam, with superheated steam, with hot air, with microwaves, with infrared radiation, with laser or electron beams or with other suitable energy transfer techniques.

A distinction is made between one- and two-phase fixing operations. In one-phase fixing the necessary fixing chemicals are already on the textile substrate. In the case of two-phase fixing this pretreatment is unnecessary. Fixing requires only alkali, which is applied following inkjet printing and before the fixing operation, without drying in between. There is no need for further additions such as urea or thickener.

Fixing is followed by print aftertreatment, which is the prerequisite for good fastnesses, high brilliance and an immaculate white ground.

The prints prepared with the inks mentioned, especially on cellulose fiber materials, possess a high color strength and a high fiber-dye bond stability not only in the acidic, but also in the alkaline range, and also possess good light fastness and very good wet fastness properties, such as fastness to washing, water, seawater, crossdyeing and perspiration, and also good fastness to heat setting and pleating, and crooking.

The examples which follow serve to illustrate the invention. Parts and percentages are by weight unless noted otherwise. The relationship of parts by weight to parts by volume is that of the kilogram to the liter. The compounds described by formula in the examples are written in the form of the sodium salts, since they are generally prepared and isolated in the form of their salts, preferably sodium or potassium salts, and are used in the form of their salts for coloring. The starting compounds specified in the examples especially table examples below can be used for synthesis in the form of the free acid or likewise in the form of their salts, preferably alkali metal salts, such as sodium or potassium salts.

EXAMPLE 1

A suspension of 800 parts of water and 114 parts of the monoazo compound of the formula (11) where M is sodium, is adjusted to a pH of 5 with sodium carbonate. 36.9 parts of cyanuric chloride are then introduced and the batch is stirred at room temperature for 2 hours while maintaining the pH at 5.5 to 6.0 with sodium carbonate. To complete the reaction, the batch is heated to 35-40° C. and subsequently stirred at pH 5.5-6.0 for 90 minutes.

The suspension obtained is admixed with 81.22 parts of a neutral 35% solution of N-methyltaurine. The batch is subsequently stirred at 50-60° C. for 8 hours while the pH is maintained at 5-6 by addition of sodium carbonate.

The as-synthesized solution is worked up to obtain the electrolyte-containing compound of the formula (1a)

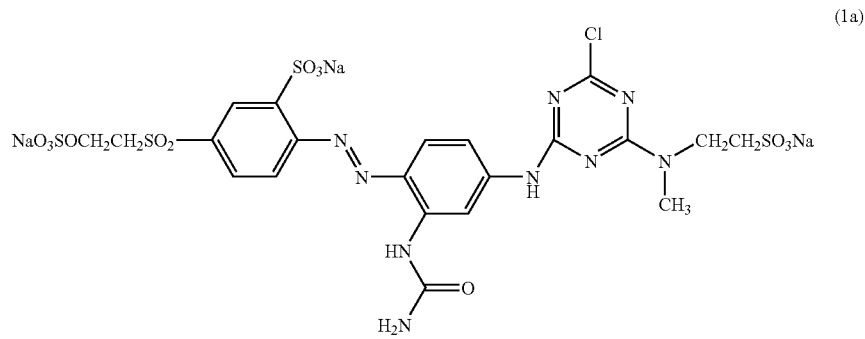

which has very good dye properties and when applied and fixed by the methods customary for fiber-reactive dyes provides strong reddish yellow dyeings and prints of good light- and wetfastness properties on cotton for example. The high color strengths of these dyeings is particularly notable.

EXAMPLE 2

A solution, adjusted to pH 7 with sodium carbonate, of 2000 parts of water and 114 parts of the monoazo compound of the formula (11) where M is sodium is admixed with 40.5 parts of cyanuric fluoride at 0° C. in the course of 20 minutes. The pH is allowed to drop to 6 and is maintained at 6 by addition of sodium carbonate. The batch is subsequently stirred for 20 minutes.

Then, 81.2 parts of a neutral 35% aqueous solution of N-methyltaurine are added dropwise. The batch is subsequently stirred at pH 6.5 for 4 hours during which it is slowly allowed to warm to room temperature.

The as-synthesized solution is worked up to obtain the electrolyte-containing compound of the formula (1b)

are mixed together. The dye mixture of the present invention is isolated in a molar mixing ratio of dye (1a) to dye (2a) of 50:50 from the combined solution by spray-drying the dye solution. The dye mixture obtained, which contains electrolyte salts, such as sodium chloride and sodium sulfate from the synthesis, has very good dyeing properties and provides for example on cellulosic fiber materials, such as cotton, or regenerated cellulose fibers in an exhaust dyeing process customary for fiber-reactive dyes level yellow dyeings possessing a very high color strength.

EXAMPLE 4

1000 parts of an aqueous as-synthesized solution comprising 168 parts of the dye of the formula (1a) and 1000 parts of an aqueous as-synthesized solution comprising 105 parts of the dye of the formula (3a)

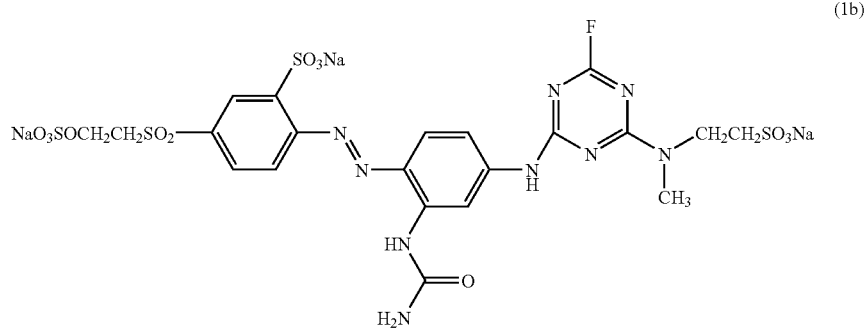
(1b)

which has very good dye properties and when applied and fixed by the methods customary for fiber-reactive dyes provides strong reddish yellow dyeings and prints of good light- and wetfastness properties on cotton for example. The high color strengths of these dyeings is particularly notable.

EXAMPLE 3

1000 parts of an aqueous as-synthesized solution comprising 84 parts of the dye of the formula (1a) and 1000 parts of an aqueous as-synthesized solution comprising 91 parts of the dye of the formula (2a)

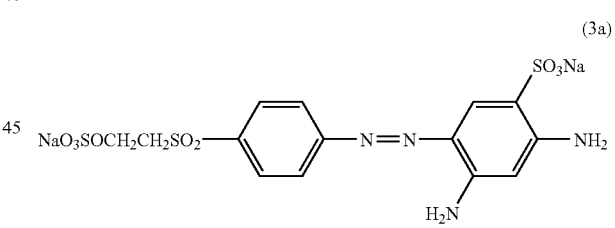
(3a)

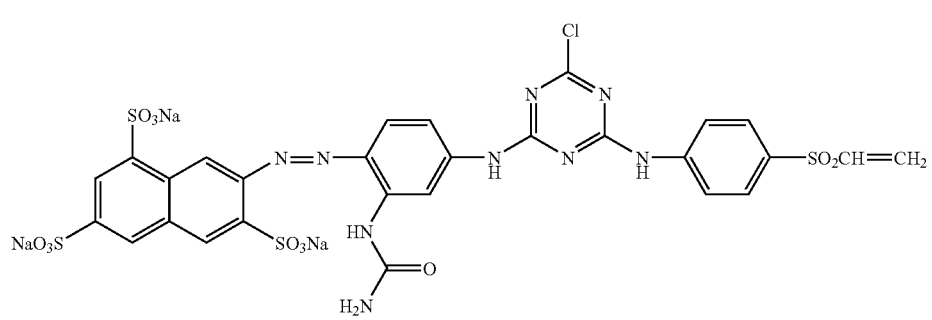
(2a)

are mixed together and the dye mixture obtained is isolated by spray-drying the dye solution. The dye mixture obtained, which contains electrolyte salts, such as sodium chloride and sodium sulfate from the synthesis has a molar mixing ratio of dye (1a) to dye (3a) of 50:50 and has very good dyeing properties and provides for example on cellulosic fiber materials, such as cotton, or regenerated cellulose fibers in an exhaust dyeing process customary for fiber-reactive dyes level yellow dyeings possessing a very high color strength.

EXAMPLE 5

800 parts of an aqueous solution comprising 40 parts of the dye of the formula (2b)

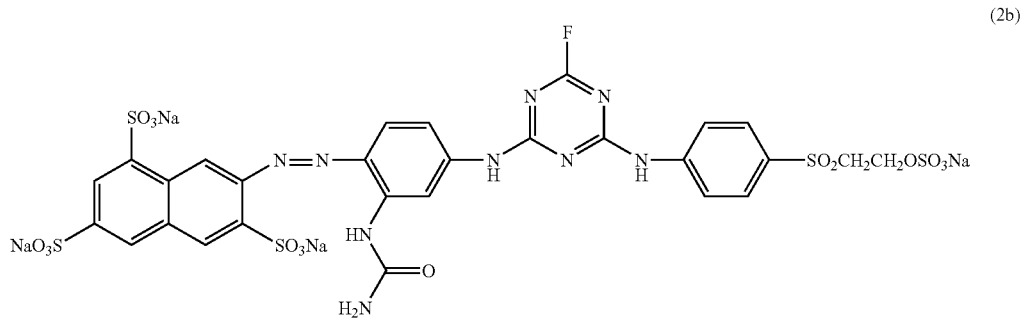

(2b)

and 700 parts of an aqueous solution comprising 49 parts of the dye of the formula (1b) are mixed together. A dye mixture is isolated in a molar mixing ratio of dye (2b) to dye (1b) of 40:60 from the combined solution by spray-drying the dye solution. The dye mixture obtained, which contains electrolyte salts, such as sodium chloride and sodium sulfate from the synthesis, has very good dyeing properties and provides for example on cellulosic fiber materials, such as cotton, or regenerated cellulose fibers in an exhaust dyeing process customary for fiber-reactive dyes level yellow dyeings possessing a very high color strength.

EXAMPLES 6 TO 40

The examples hereinbelow describe further inventive dye mixtures featuring the hereinbelow mentioned dyes.

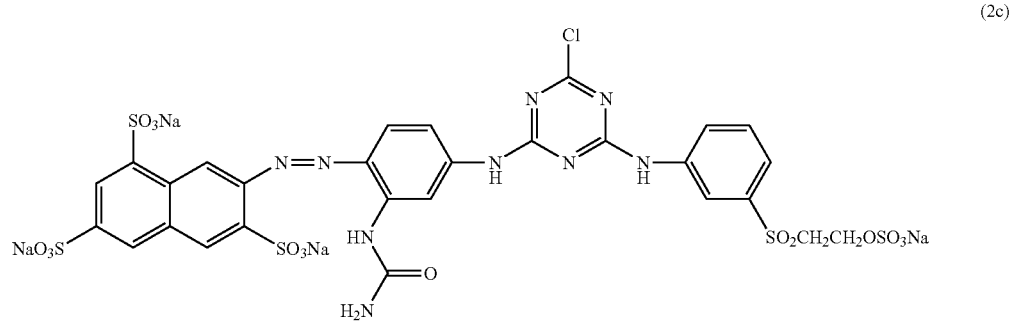

(2c)

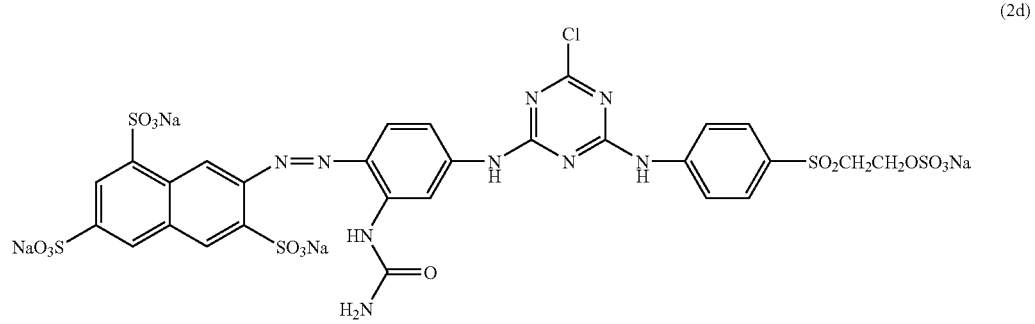

(2d)

-continued
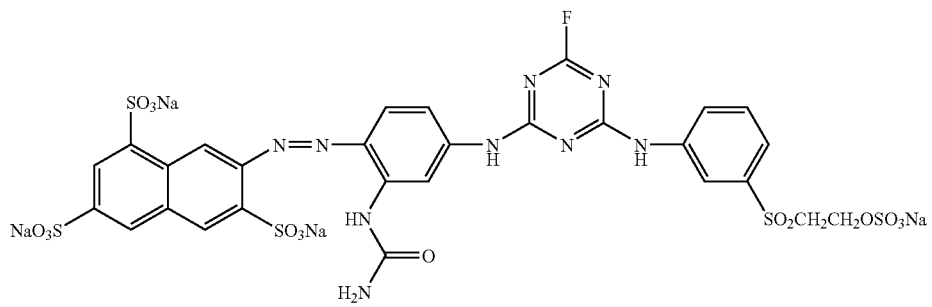
(2e)
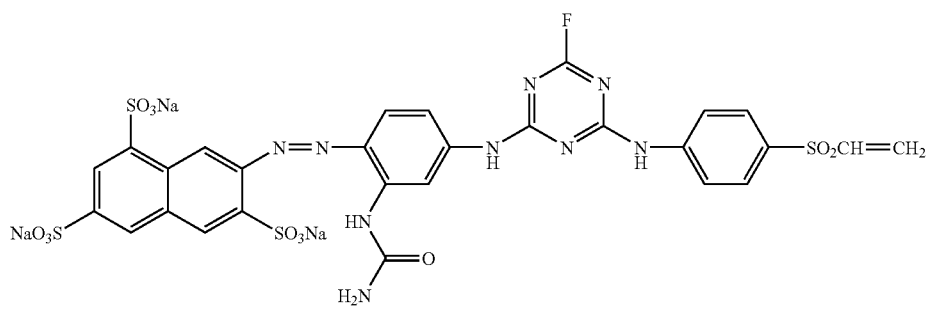
(2f)
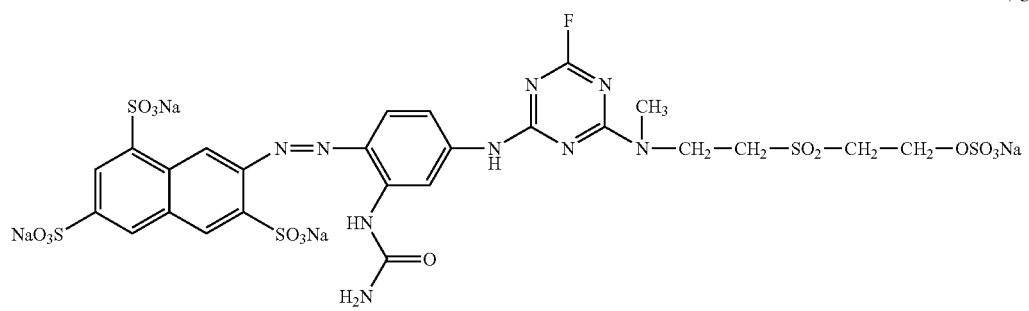
(2g)
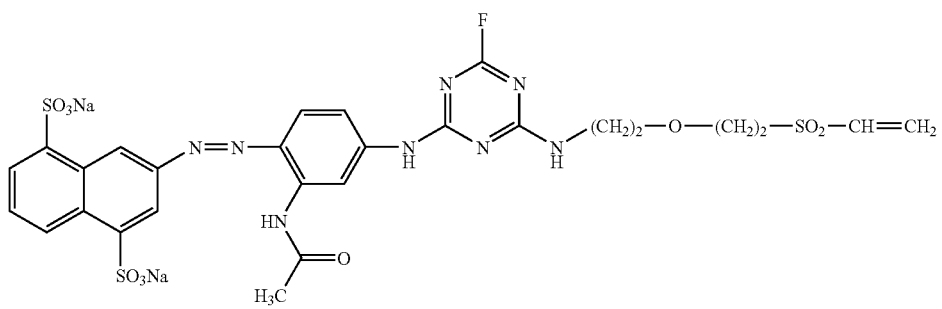
(2h)
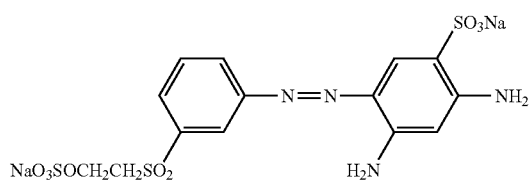
(3b)

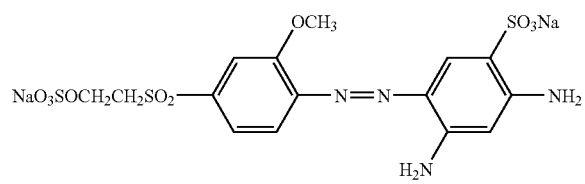
(3c)
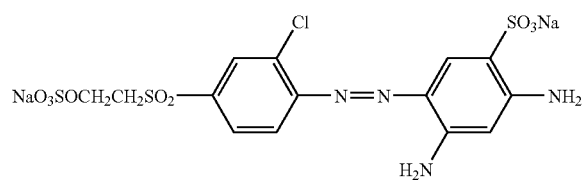
(3d)
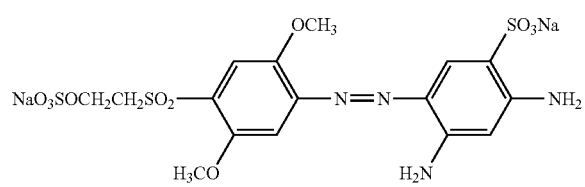
(3f)
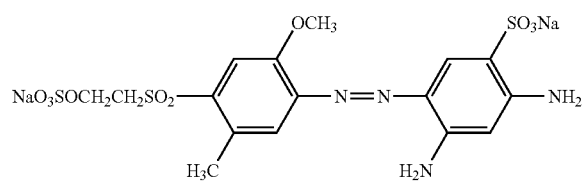
(3g)
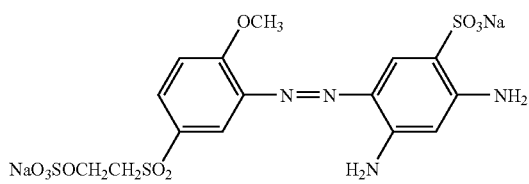
(3h)
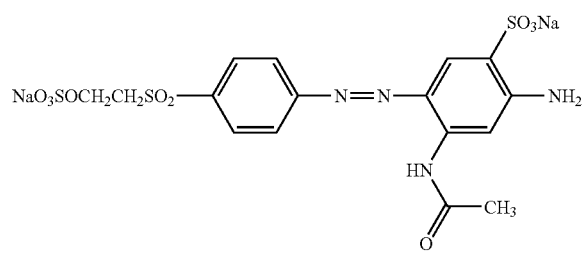
(3i)

-continued
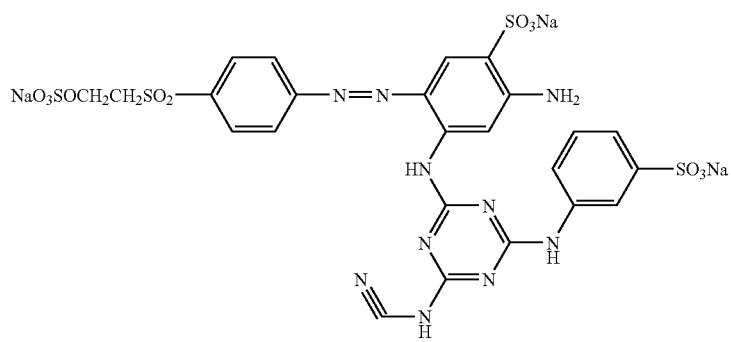
(3i)
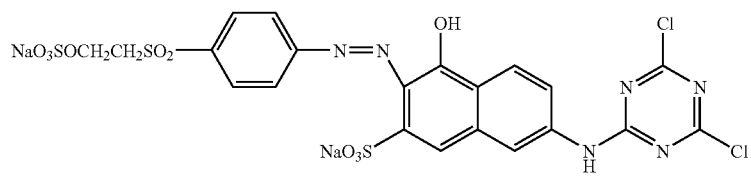
(4a)
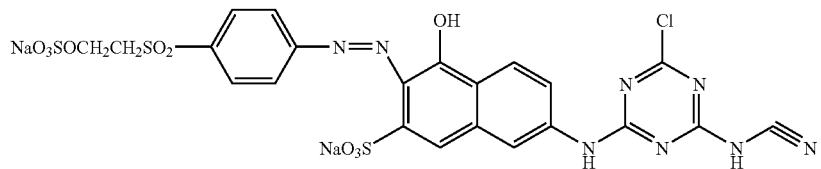
(4b)
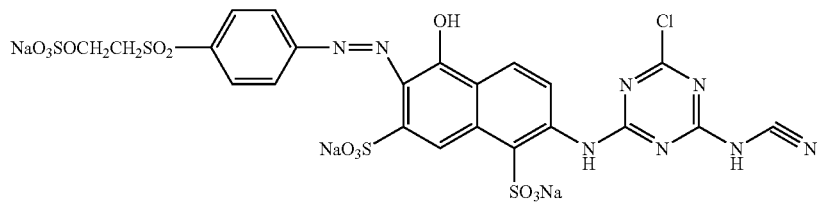
(4c)
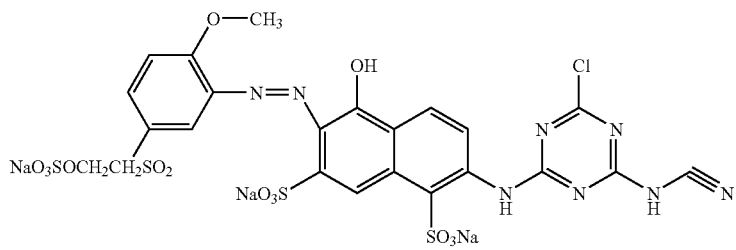
(4d)

-continued

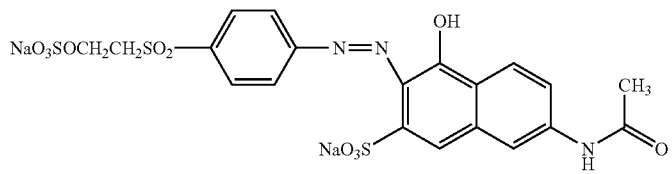
(4e)

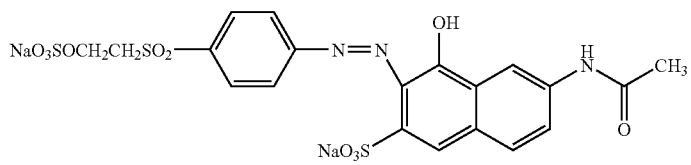
(4f)

| Example | Component I: Dye of formula (1) | Component I: Dye of formula (2), (3) or (4) | Molar ratio (I):(II) |
|---|---|---|---|
| 6 | Formula (1a) | Formula (2b) | 50:50 |
| 7 | Formula (1a) | Formula (2c) | 60:40 |
| 8 | Formula (1a) | Formula (2d) | 50:50 |
| 9 | Formula (1a) | Formula (2e) | 75:25 |
| 10 | Formula (1a) | Formula (2f) | 50:50 |
| 11 | Formula (1a) | Formula (2g) | 50:50 |
| 12 | Formula (1a) | Formula (2h) | 50:50 |
| 13 | Formula (1a) | Formula (3b) | 70:30 |
| 14 | Formula (1a) | Formula (3c) | 65:35 |
| 15 | Formula (1a) | Formula (3d) | 60:40 |
| 16 | Formula (1a) | Formula (3f) | 60:40 |
| 17 | Formula (1a) | Formula (3g) | 50:50 |
| 18 | Formula (1a) | Formula (3h) | 50:50 |
| 19 | Formula (1a) | Formula (3i) | 75:25 |
| 20 | Formula (1a) | Formula (3j) | 60:40 |
| 21 | Formula (1a) | Formula (4a) | 20:80 |
| 22 | Formula (1a) | Formula (4b) | 15:85 |
| 23 | Formula (1a) | Formula (4c) | 20:80 |
| 24 | Formula (1a) | Formula (4d) | 20:80 |
| 25 | Formula (1a) | Formula (4e) | 20:80 |
| 26 | Formula (1a) | Formula (4f) | 20:80 |
| 27 | Formula (1b) | Formula (2a) | 60:40 |
| 28 | Formula (1b) | Formula (3a) | 60:40 |
| 29 | Formula (1b) | Formula (2c) | 50:50 |
| 30 | Formula (1b) | Formula (2d) | 50:50 |
| 31 | Formula (1b) | Formula (2f) | 75:25 |
| 32 | Formula (1b) | Formula (2h) | 60:40 |
| 33 | Formula (1b) | Formula (3b) | 65:35 |
| 34 | Formula (1b) | Formula (3i) | 50:50 |
| 35 | Formula (1b) | Formula (3j) | 50:50 |
| 36 | Formula (1b) | Formula (4a) | 20:80 |
| 37 | Formula (1b) | Formula (4b) | 15:85 |
| 38 | Formula (1b) | Formula (4c) | 20:80 |
| 39 | Formula (1b) | Formula (4d) | 15:85 |
| 40 | Formula (1b) | Formula (4e) | 20:80 |

The mixtures of Examples 6 to 40 possess very good performance characteristics and provide yellow dyeings and prints having a very high color strength on the materials mentioned in the description, in particular cellulose fiber materials, by the customary methods of use in dyeing and printing, preferably by the customary application and fixing methods for fiber-reactive dyes.

What is claimed is:

1. A dye of the general formula (1)

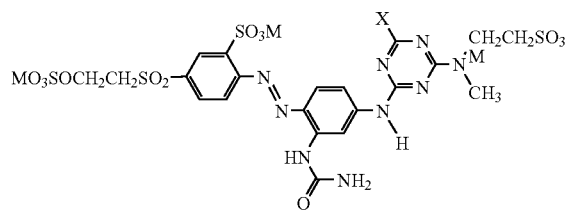

(1)

wherein
M is hydrogen or an alkali metal, and
X is chlorine or fluorine.

2. The dye according to claim 1, wherein X is chlorine.
3. The dye according to claim 1, wherein X is fluorine.
4. The dye according to claim 1, wherein M is hydrogen.
5. The dye according to claim 1, wherein M is an alkali metal.
6. A dye mixture comprising one or more of the dyes of the general formula (1)

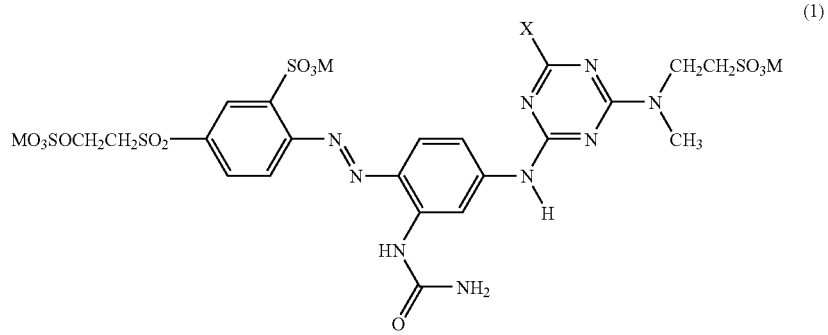

(1)

wherein
M is hydrogen or an alkali metal, and
X is chlorine or fluorine and
also one or more further fiber-reactive dyes.

7. The dye mixture according to claim 6, comprising one or more of the dyes of the general formula (1) and also at least one dye selected from the general formulae (2), (3) and (4)

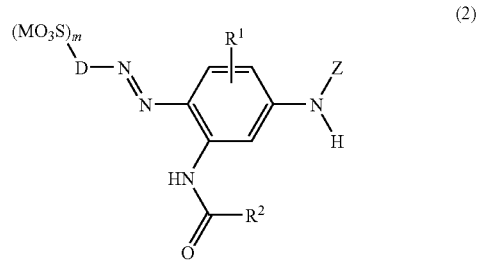

(2)

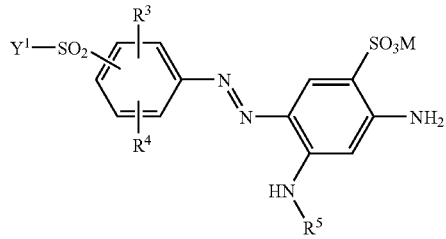

(3)

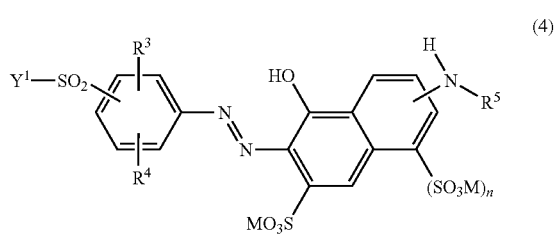

(4)

wherein
D is the radical of benzene or of naphthalene;
$R^1$ is hydrogen, $(C_1$-$C_4)$-alkyl, $(C_1$-$C_4)$-alkoxy or —$SO_3M$;
$R^2$ is amino, $(C_1$-$C_4)$-alkyl or $(C_1$-$C_4)$-alkyl substituted by —COOM, —$SO_3M$ or —$SO_2$—$Y^1$;
$R^3$ is hydrogen, chlorine, $(C_1$-$C_4)$-alkyl, $(C_1$-$C_4)$-alkoxy or —$SO_3M$;
$R^4$ is hydrogen, $(C_1$-$C_4)$-alkyl or $(C_1$-$C_4)$-alkoxy;
$R^5$ is hydrogen or —CO—$R^2$ or has one of the meanings of Z;
$Y^1$ is vinyl or is ethyl substituted by an alkali-eliminable substituent in the β position;
Z is a fiber-reactive radical selected from the group consisting of the halopyrimidines, of the dichloro-quinoxalines or of the halotriazines;
m is 1, 2 or 3;
n is 0 or 1; and
M is hydrogen or an alkali metal.

8. The dye mixture according to claim 7, wherein the group $(MO_3S)_m$-D- in the general formula (2) represents the groups of the general formulae (5a) to (5c) and also of the general formulae (7a) to (7e)

(5a) 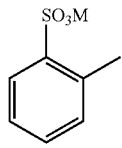

(5b) 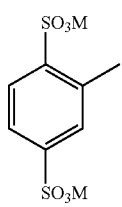

(5c) 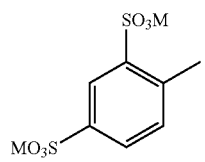

(7a) 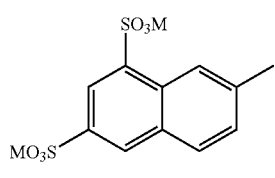

(7b) 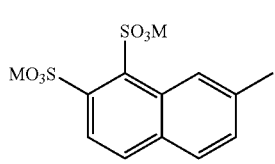

(7c) 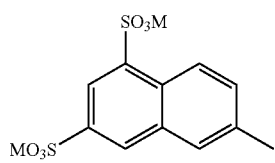

(7d) 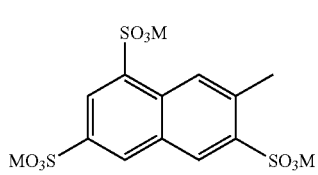

-continued (7e) 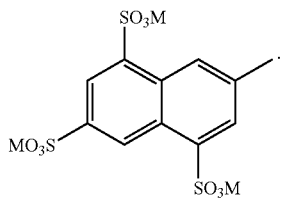

9. The dye mixture according to claim 7, wherein fiber-reactive radicals Z are halotriazines have the general formula (9)

(9) 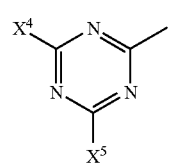

where $X^4$ is halogen, —NHCN or $X^5$; and $X^5$ is a group of the general formula (10)

(10) 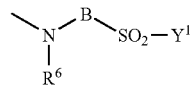

where $R^6$ is hydrogen or $(C_1-C_4)$-alkyl;

B is $(C_2-C_6)$-alkylene, $(C_2-C_6)$-alkylene interrupted by a heteroatom, or is phenylene; and $Y^1$ is as defined above.

10. The dye mixture according to claim 9, wherein $X^4$ is fluorine or chlorine, or —NHCN or is $X^5$; and $X^5$ is a group of the general formula (10)

(10) 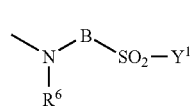

where $R^6$ is hydrogen or methyl;

$Y^1$ is vinyl or is ethyl substituted by an alkali-elimnable in the β position; and B is ethylene or $(C_2-C_6)$-alkylene interrupted by an —O—.

11. The dye mixture according to claim 7, wherein the dye of the general formula (1) is present in an amount from 90% to 10% by weight and at least one dye selected from the general formulae (2), (3) and (4) is present in an amount from 10% to 90% by weight, all based on the total amount of dye.

12. A process for preparing a dye of the general formula (1),

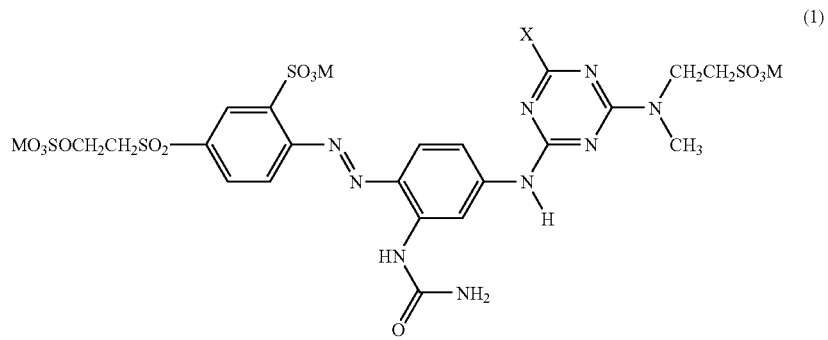

(1)

wherein
  M is hydrogen or an alkali metal, and
  X is chlorine or fluorine,
which comprises acylating a monoazo compound of the general formula (11)

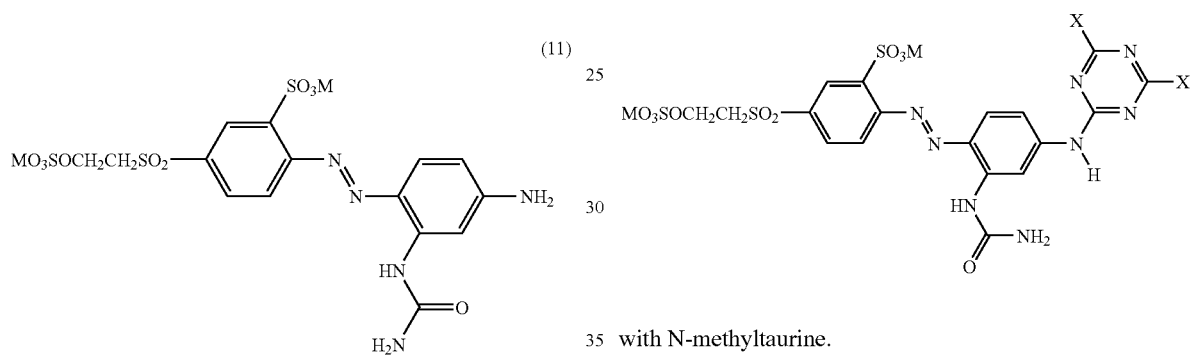

(11)

wherein M is hydrogen or an alkali metal, with a triazine compound of the general formula (12)

wherein X is chlorine or fluorine, and then condensing the resulting compound of the general formula (13)

(13)

with N-methyltaurine.

13. A process of printing or dying a hydroxyl- and/or carboxamido-containing material which comprises contacting said material with a dye of the general formula (1)

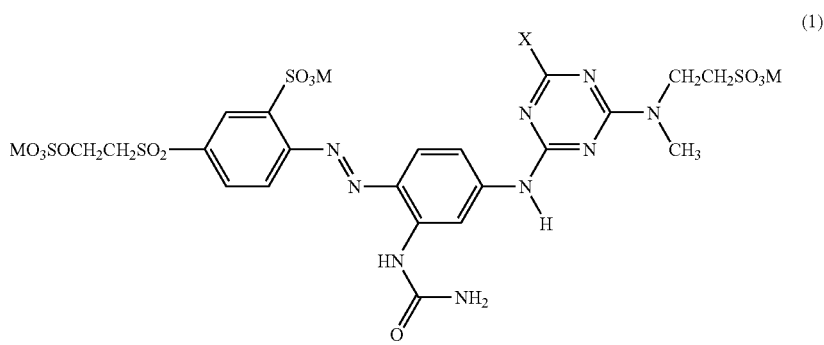

(1)

wherein
  M is hydrogen or an alkali metal, and
  X is chlorine or fluorine.

14. A printing ink comprising the dye of the general formula (1) according to claim 1.

15. A process for producing the dye mixture according to claim 6, which comprises mechanically mixing the dye of the general formula (I) and the further fiber-reactive dye.

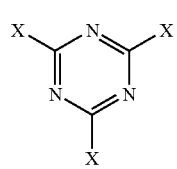

(12)

* * * * *